US006363434B1

(12) United States Patent
Eytchison (10) Patent No.: US 6,363,434 B1
(45) Date of Patent: Mar. 26, 2002

(54) METHOD OF MANAGING RESOURCES WITHIN A NETWORK OF CONSUMER ELECTRONIC DEVICES

(75) Inventor: Edward Blaine Eytchison, Milpitas, CA (US)

(73) Assignees: Sony Corporation of Japan, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/281,636

(22) Filed: Mar. 30, 1999

(51) Int. Cl.[7] .................................................. G06F 9/00
(52) U.S. Cl. ........................ 709/313; 709/312; 709/314; 709/315; 709/316; 709/317; 709/318; 709/245
(58) Field of Search ................................. 709/313, 245, 709/314, 315, 316, 317, 318, 323; 725/78, 79, 80, 81, 82, 95, 96; 370/352, 468

(56) References Cited

U.S. PATENT DOCUMENTS

| | | | |
|---|---|---|---|
| 4,893,199 A | | 1/1990 | Okada .......................... 360/48 |
| 5,420,573 A | | 5/1995 | Tanaka et al. .......... 340/825.24 |
| 5,537,605 A | | 7/1996 | Teece .......................... 395/800 |
| 5,671,225 A | * | 9/1997 | Hooper et al. .............. 370/468 |
| 5,678,041 A | | 10/1997 | Baker et al. ................. 395/609 |
| 5,696,898 A | | 12/1997 | Baker et al. ........... 395/187.01 |
| 6,275,865 B1 | * | 11/1998 | Zou ........................... 709/313 |
| 5,875,395 A | * | 2/1999 | Holmes ....................... 455/420 |
| 5,886,995 A | * | 3/1999 | Arsenault et al. ........... 370/477 |
| 5,892,900 A | | 4/1999 | Ginter et al. ................ 395/186 |
| 5,926,476 A | * | 7/1999 | Ghaibeh ...................... 370/395 |
| 5,933,498 A | | 8/1999 | Schneck et al. ............... 380/4 |
| 5,935,206 A | * | 8/1999 | Dixon et al. ................. 709/219 |
| 5,960,445 A | | 9/1999 | Tamori et al. ............... 707/203 |
| 6,005,861 A | * | 12/1999 | Humpleman ................. 370/352 |
| 6,065,055 A | | 5/2000 | Hughes et al. .............. 709/229 |
| 6,219,840 B1 | * | 4/2001 | Corrigan et al. ............ 725/117 |
| 6,272,127 B1 | * | 8/2001 | Golden et al. .............. 370/352 |

OTHER PUBLICATIONS

Sony et ak.; "The HAVI Architecture"; Specification of the Home Audio/Video Interoperability (HAVI) Architecture; Mat 11, 1998; Copyright 1997, 1998; Ver. 0.8.

Soney et al.; "The HAVI specification"; Specification of the Home Audio/Video Interoperability (HAVI) Architecture; Nov. 19, 1998, Ver. 1.0 beta.

* cited by examiner

*Primary Examiner*—Dung C. Dinh
*Assistant Examiner*—Chuong Ho
(74) *Attorney, Agent, or Firm*—Wagner, Murabito & Hao LLP (57) ABSTRACT

A method of managing resources within a network for consumer electronic media devices. In one embodiment, the method is implemented as a software resource manager which provides a centralized resource allocation, reservation and access control functionalities for a home entertainment server. Particularly, user applications of the home server receive instructions from a user or other entities for a media service, and converts the instructions into a request that identifies the necessary resources for providing the media service. The software resource manager then determines whether such resources are available upon receiving the request. Importantly, the software resource manager also determines whether a routing path between the necessary resources has sufficient bandwidth for performing the requested media service. If necessary resources and bandwidth are available, the software resource manager then sends control signals to the source and destination devices causing them to perform the requested media services. Additionally, the software resource manager of the present invention provides event scheduling and request arbitration functionalities to the home entertainment server. In this manner, a secure home entertainment network that is protected from misuse and abuse can thus be achieved.

21 Claims, 6 Drawing Sheets

METHOD OF MANAGING RESOURCES WITHIN A NETWORK OF CONSUMER ELECTRONIC DEVICES

FIELD OF THE INVENTION

The present invention pertains generally to the field of consumer electronic devices. More specifically, the present invention pertains to the field of networked consumer electronic media devices.

BACKGROUND OF THE INVENTION

A home entertainment system typically includes a number of consumer electronic media devices such as televisions, compact disc (CD) players, tuners, digital video disc (DVD) players, a video cassette recorders (VCRs) and high-fidelity speakers. Many sets of wires are usually required to connect these components together to provide the desired functionality. For example, a set of wires is required for connecting the DVD player to the TV and another set of wires is required for connecting the DVD player to the tuner. Yet another set of wires is required for connecting the tuner to the speakers. Most of these devices only have a limited number of inputs and outputs for connecting to other devices. Thus, it is not surprising that most home entertainment systems include only a handful of different devices.

Recently, a class of consumer electronic media devices has been introduced that can be networked together using a standard communication protocol layer (e.g., IEEE 1394 communication standard). The IEEE 1394 standard is an international standard for implementing an inexpensive high-speed serial bus architecture which supports both asynchronous and isochronous format data transfers. The IEEE 1394 standard provides a high-speed serial bus for interconnecting digital devices thereby providing universal input/output connection. The IEEE 1394 standard defines a digital interface for applications thereby eliminating the need for an application to convert digital data to an analog form before it is transmitted across the bus. Correspondingly, a receiving application will receive digital data from the bus, not analog data, and will therefore not be required to convert analog data to digital form. The IEEE 1394 standard is ideal for consumer electronics communication in part because devices can be added to or removed from the serial bus while the bus is active. If a device is so added or removed, the bus automatically reconfigures itself for transmitting data between the then existing devices. Each device on the bus is a "node" and contains its own address space.

The provision of the IEEE 1394 serial communication bus for networking consumer electronic devices has allowed the development of a home entertainment network that consists of a large number of consumer electronic devices. In addition, the provision of the IEEE 1394 serial bus enables a single source device to provide content to multiple destination devices. For example, a DVD player located in the living room can be shared by multiple TV sets located in the bedrooms and in the kitchen. However, one problem associated with sharing source devices within the home entertainment network is that multiple users may want to use the same source devices at the same time. Therefore, it would be advantageous to provide an access control system that allocates control of the devices intelligently.

Another problem associated with such a home entertainment network is bandwidth contention. For example, if many TV sets and DVD players are connected to the home network, the IEEE 1394 serial bus may not have sufficient bandwidth to support multiple simultaneous isochronous channels for multiple video streams. Therefore, it would be advantageous to provide a method of managing a network of consumer electronic media devices. It would also be advantageous to provide a method of managing resources within a network of consumer electronic media devices such that the problem of bandwidth contention is addressed.

Yet another problem associated with a home entertainment network is that, since media (e.g., CDs, DVDs) are distributed across the network, it is burdensome for a user to locate the desired media. For example, a home entertainment network may include several DVD players and DVD jukeboxes each capable of holding hundreds of DVDs. It would be difficult for a user to browse through every devices to locate the desired DVD. Therefore, it would be advantageous to provide a method of managing resources within the home network such that complicated management and control of the devices are hidden from the users.

Another problem associated with the home entertainment network is that, when connected to the Internet, the consumer electronic devices and information contained therein may become compromised due to unauthorized access from third party users (e.g., hackers). Therefore, it would be advantageous to provide a method of managing resources within the home network such that the devices are protected from misuse and unauthorized accesses.

SUMMARY OF THE DISCLOSURE

Accordingly, the present invention provides for an intelligent centralized resource allocation, reservation and access control system for a home entertainment network. Furthermore, the present invention provides for a method of managing resources within a home entertainment network such that accesses to resources are granted based on access rights associated with each resource. Applications attempting to access the devices of the network must do so through a software resource manager. The present invention also provides for a method of managing resources within the home entertainment network such that media-services can be delivered to a user without requiring the user to directly control the devices.

In furtherance of the present invention, the home entertainment network includes a plurality of consumer electronic media devices (e.g., Digital Video Disc Players, TVs, etc.) and a home entertainment server coupled together via high speed connections such as the IEEE 1394 bus. Particularly, user applications of home entertainment network have no direct control over the devices. Rather, user applications can only request the software resource manager, which has complete control over all the devices, to provide the media service. The software resource manager then determines whether the devices necessary for providing the media service are available. Importantly, the software resource manager also determines whether a routing path between the necessary devices has sufficient bandwidth for providing the requested media service. If necessary devices and bandwidth are available, the software resource manager then sends control signals to the devices and causes them to provide the requested media services. In this manner, resources of the home entertainment network are hidden from the users and other user applications. Because the devices are isolated from the user applications, a secure home entertainment network can also be achieved.

In one embodiment of the present invention, the software resource manager maintains a resource database for tracking availability of the consumer electronic devices of the home entertainment network. Once a device is in-use, or otherwise becomes unavailable, the device is removed from the resource database. When the device becomes available again, it is added to the resource database. In this way, the software resource manager can easily determine the availability of the devices. The software resource manager further maintains a path database for tracking the availability of the routing paths between the devices. The path database stores all possible routing paths between all the devices and the bandwidth requirements for all the devices. With such information, the software resource manager can then readily determine whether the network can provide sufficient bandwidth to deliver the requested media service.

In accordance with another embodiment of the present invention, the software resource manager provides a reservation database for storing resource reservation information. In this embodiment, the resource manager is configured for receiving a request for a future media service. The request is then stored within the reservation database. The home server of the present invention further provides a scheduler for scheduling the execution of the requested media service at a future time.

These and others advantages of the present invention not specifically mentioned above will become clear within discussions presented herein.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

In the following detailed description of the preferred embodiments, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

I. COMPUTER SYSTEM ENVIRONMENT OF THE PRESENT INVENTION

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "collecting", "computing", "determining", "grouping", "mapping", "assigning" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1:
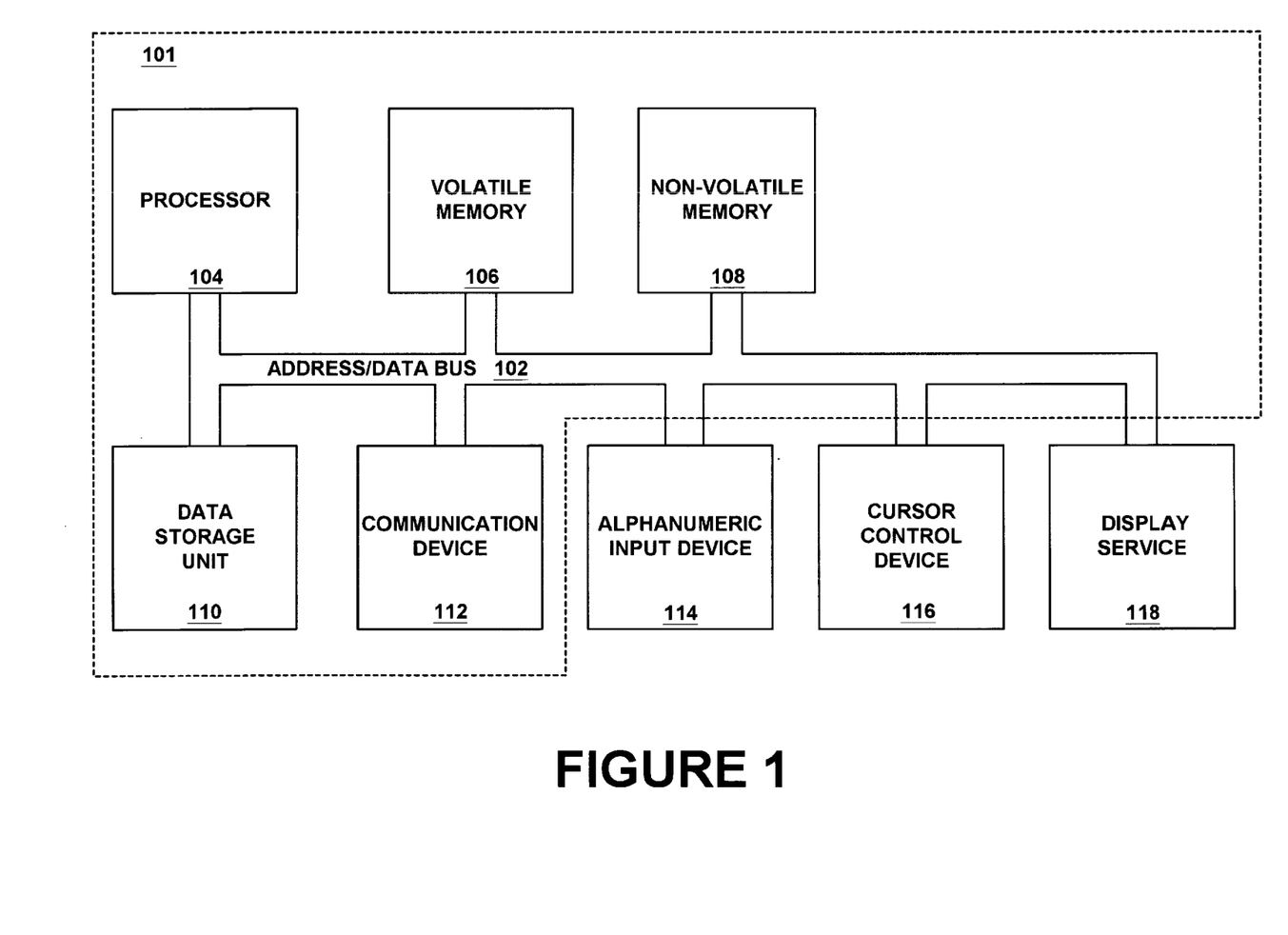
FIG. 1 is a block diagram illustrating components of a home server in accordance with the present invention.

Specific aspects of the present invention are operable within a home server system. In general, a home server (or other intelligent electronic device such as a set-top-box) for the home entertainment network in accordance with the present invention includes a general purpose computer system 101 operable as a platform to implement and support elements of the present invention. As shown in FIG. 1, computer system 101 includes an address/data bus 102 for communicating information including address, data, and control signals, a central processor 104 coupled with bus 102 for processing information and instructions, a volatile memory 106 (e.g., random access memory RAM) coupled with the bus 102 for storing information and instructions for the central processor 104 and a non-volatile memory 108 (e.g., read only memory ROM) coupled with the bus 102 for storing static information and instructions for the processor 104, a data storage device 110 such as a magnetic or optical disk and disk drive coupled with the bus 102 for storing information and instructions, an optional display device 118 coupled to the bus 102 for displaying information to the computer user, an optional alphanumeric input device 114 including alphanumeric and function keys coupled to the bus 102 for communicating information and command selections to the central processor 104, an optional cursor control or directing device 116 coupled to the bus 102 for communicating user input information and command selections to the central processor 104, and a communication device 112 coupled to the bus 102 for communicating signals that are input and output from the system 101. The communication device 112 is configured for connecting to a home entertainment network via an IEEE 1394 serial communication bus 215. Computer 101 may further include another communication device (e.g., a modem) for connecting the home network to the Internet.

Program instructions executed by the home server 101 can be stored in computer usable memory units such as RAM 106, ROM 108, or in the storage device 110, and when executed in a group can be referred to as logic blocks or procedures. It is appreciated that data produced at the various stages of the present invention, including path availability information and resource availability information, can also be stored in RAM 106, ROM 108 or the storage device 110 as shown in FIG. 1.

The display device 118 of FIG. 1 utilized with the computer system 101 of the present invention is optional and may be a flat panel liquid crystal display (LCD) device, a TV, a personal digital assistant (PDA) or other display device suitable for creating graphic images and alphanumeric characters recognizable to the user. The cursor control device 116 allows the computer user to dynamically signal the two dimensional movement of a visible pointer on a display screen of the display device 118. Many implementations of the cursor control device are known in the art including a trackball, mouse, joystick or special keys on the alphanumeric input device 114 capable of signaling movement of a given direction or manner of displacement.

II. NETWORK ENVIRONMENT IN ACCORDANCE WITH THE PRESENT INVENTION

Figure 2:
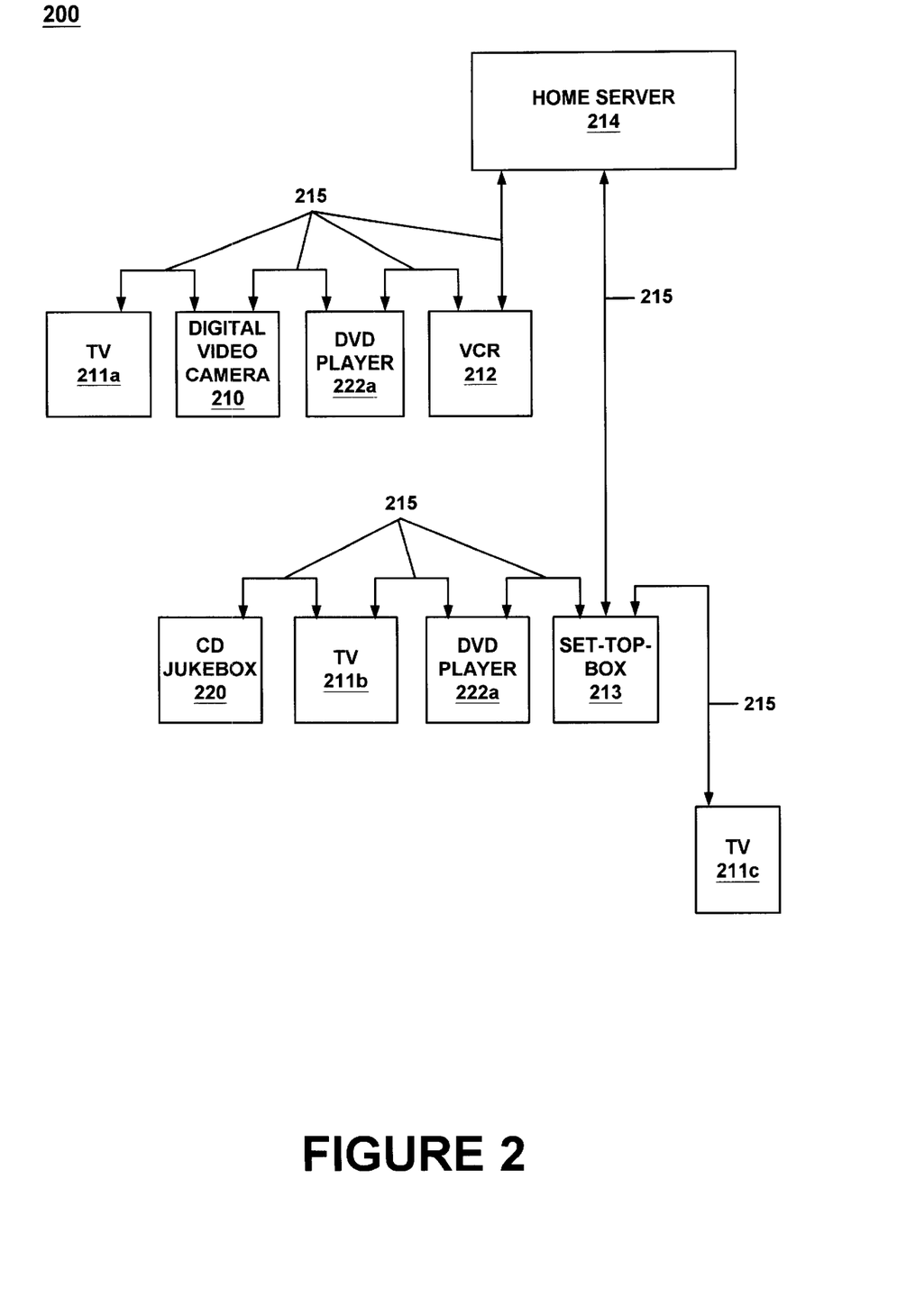
FIG. 2 illustrates an exemplary home entertainment network in which embodiments of the present invention may be practiced.

FIG. 2 illustrates an exemplary home entertainment network 200 in which the present invention may be practiced. Exemplary network 200 includes consumer electronic media devices (including computer systems) as nodes but could be extended equally well to cover other electronic devices. Exemplary network 200 includes a digital video camera 210, a video cassette recorder (VCR) 212, a home server 214, a set-top-box 213, television sets (TVs) 211a–211c, a compact disc (CD) jukebox 220 and DVD players 222a–222b connected together by IEEE 1394–1995 (IEEE 1394) bus 215. The set-top-box 213 can be coupled to receive media from a cable TV system. The IEEE 1394 bus lines, or "cables," allow the consumer electronic media devices to transmit data, commands and parameters to other devices of the network 200.

It should be noted that home network 200 illustrated in FIG. 2 is exemplary only and that an audio/video network in accordance with the present invention could include many different combinations of components. It should also be appreciated that consumer electronic devices of the network 200 may be accessed via user applications such as a web-browser.

The IEEE 1394 communication standard within network 200 of FIG. 2 supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of a "real-time" application for the transfer of data isochronously is from VCR 212 to TV 211a of FIG. 2. The VCR 212 records images and sounds and saves the data in discrete packets. The VCR 212 then transfers each packet, representing the images and sounds recorded over a limited time period, during that time period, for display by the TV 211a. The IEEE 1394 standard bus architecture provides multiple channels for isochronous data transfers between applications. Specifically, a six bit channel number is broadcast with the data to ensure reception by the appropriate application. This feature of the IEEE 1394 bus allows multiple devices to simultaneously transmit isochronous data across the bus structure. This feature also enables media (e.g., CDs, DVDs, video cassettes, etc.) to be distributed across the home network 200. Further, this feature enables the devices of the home entertainment network 200 to be distributed across the home.

III. RESOURCE MANAGER ACCORDING TO THE PRESENT INVENTION

A feature of the present invention is that all resources of a home entertainment network (e.g., devices, routing paths between devices, etc.) are controlled and managed by a software resource manager. According to one embodiment of the present invention, a home network resource is defined to be the physical devices that are capable of transporting, housing, and displaying content. This means that if the device is actively generating content or controlling information (via the device or a device proxy), the software resource manager is free to signal the device to stop producing content or to redirect the content to another destination.

Further, any application programs (e.g., web-browsers) that use or attempt to use the resources are required to communicate with the software resource manager. Generally, direct communication between the application programs and the devices or device proxies is not allowed. An application program is only allowed to request the software resource manager to control the devices. By inserting a control layer between application programs and the device proxies, the devices will be protected against misuse and abuse (e.g., unauthorized access or modification). Additionally, the software resource manager provides other useful functions such as resource allocation and resource reservation.

Figure 3:
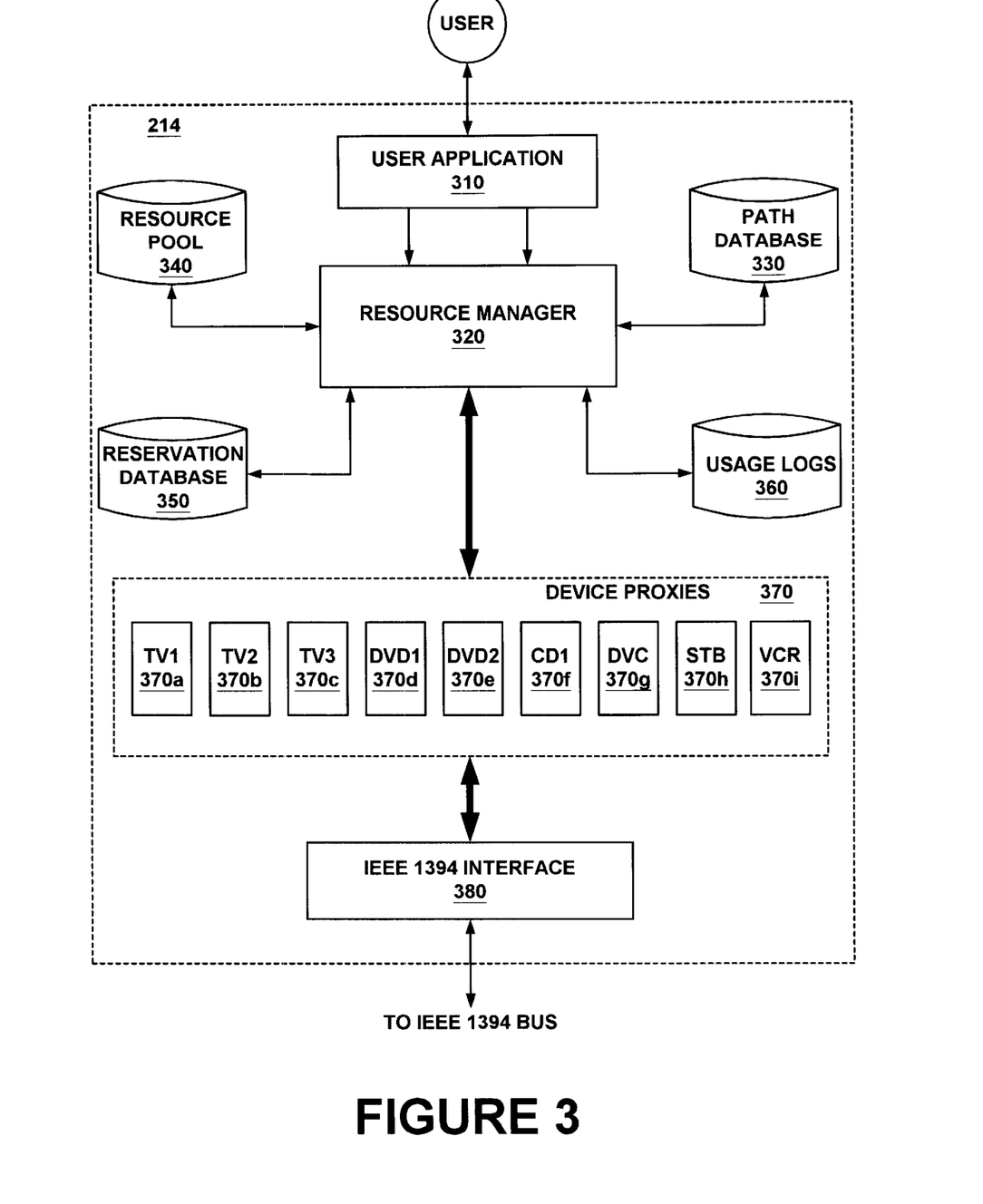
FIG. 3 is a logical block diagram of the software processes of a home server illustrated in FIG. 2 in accordance with the present invention.

FIG. 3 is a logical block diagram of the software processes of a home server 214 in accordance with the present invention. As illustrated, software processes of home server 214 include a user application 310, a resource manager 320, a path database 330 and a resource pool 340. Software processes of the home server 214 further include a reservation database 350 and a usage log 360. Home server 214 further includes a plurality of software device proxies 370a–370i each for controlling one of the devices of home entertainment network 200. For example, software device proxy 370c is for controlling TV 211c, and device proxy 370l is for controlling VCR 212, etc., that are coupled to the IEEE 1394 bus interface 380. In one embodiment of the present invention, the software device proxies 370 may include HAVI Device Control Modules (DCMs) and Functional Control Modules (FCMs).

Significantly, according to the present invention, user application 310 is not allowed to communicate directly with software device proxies 370. Rather, user application 310 communicates to the resource manager 320 when it intends to access one of the network consumer electronic media devices. Particularly, user application 310 receives instructions from a user or other entities for a media service, and converts the instructions into a request that identifies the necessary resources for providing the media service. In the following discusion, a media service is defined as content that is displayed or actions that are performed on behalf of the users. For example, an external sensor triggering digital video camera 210 to capture video would be considered a media service.

In the present embodiment, the user application 310 of FIG. 3 sends the request to the resource manager 320 in the form of an event list that indicates the source device, the destination device and the requested action. Thereafter, the resource manager 320 determines the availability of the source and destination devices, and checks whether sufficient bandwidth is available for carrying out the requested action. If the devices and the bandwidth are available, the resource manager 320 will return a "granted" signal and transmits the necessary control commands to the software device proxies 370a–370i. The software device proxies 370a–370i then control the devices via IEEE 1394 bus interface 380. If the devices or the requisite bandwidth are not available, the resource manager 320 will return a "denied" signal to the user application 310.

Importantly, according to the present invention, resource manager 320 allows the resources of home network 200 to be checked-in or checked-out independent of application requests. At any time, the resource manager 320 can reclaim checked-out resources and reallocate them to other users. Likewise, a reserved resource can be reclaimed and reallocated to other users or reallocate them back into the resource pool 340.

According to the present invention, the resource manager 320 of FIG. 3, upon initialization of the home server 214, scans the home network 200 and determines all the available resources. Data representative of the routing paths and their bandwidths are then stored within path database 330. Data representative of the available devices are stored within resource pool 340. As the resources of the home network 200 changes, the resource manager 320 modifies the path database 330 and the resource pool accordingly.

User application 310 may also send a request for media services to be delivered at a future time. In the present embodiment, the request is in the form of a scheduled-event list. Particularly, the scheduled-event list may indicate the time the scheduled-event is to be performed, and the necessary routing paths and device information. The resource manager 320, upon receiving the scheduled-event list, then checks the reservation database 350 to determine whether the devices and the routing paths have already been reserved by other processes. If not, the resource manager 320 then enters the devices and routing paths within the reservation database 350. The resource manager 320 also accesses a scheduler (not shown) to schedule the future execution of the scheduled-event list.

Usage information of the network is stored within usage log 360 of FIG. 3. According to the present invention, every time a request for media service is granted, the event list is stored within the usage log 360. The usage information can be used to track warranty information of the devices. In addition, the usage information can be used to track the network usage of each user. The usage information may also be used by the resource manager 320 for restricting access to certain users who have exceeded their usage limitation.

Figure 4:
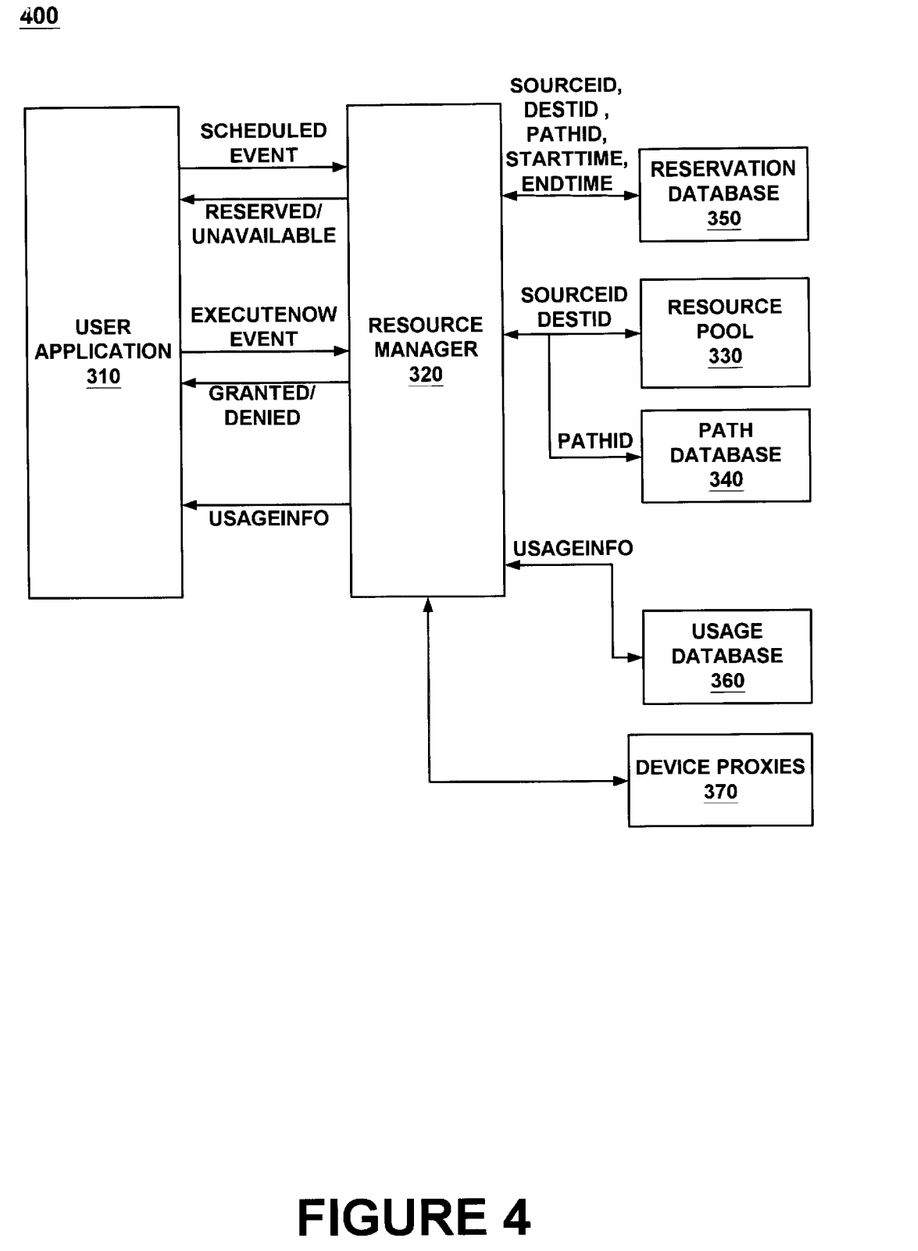
FIG. 4 is a data flow diagram illustrating the detailed communication protocol between user application and software resource manager illustrated in FIG. 3 in furtherance of the present invention.

FIG. 4 is a logical block diagram 400 illustrating the data flow between user application 310 and resource manager 320 in accordance with the present invention. Data flows between resource manager 320 and reservation database 350, resource pool 330, path database 340, usage log 360 and device proxies 370 are also illustrated. Resource manager 320 stores device usage information within the usage log 360. In addition, the resource manager 320 may send a UsageInfo to the user application 310 when prompted.

Figure 5:
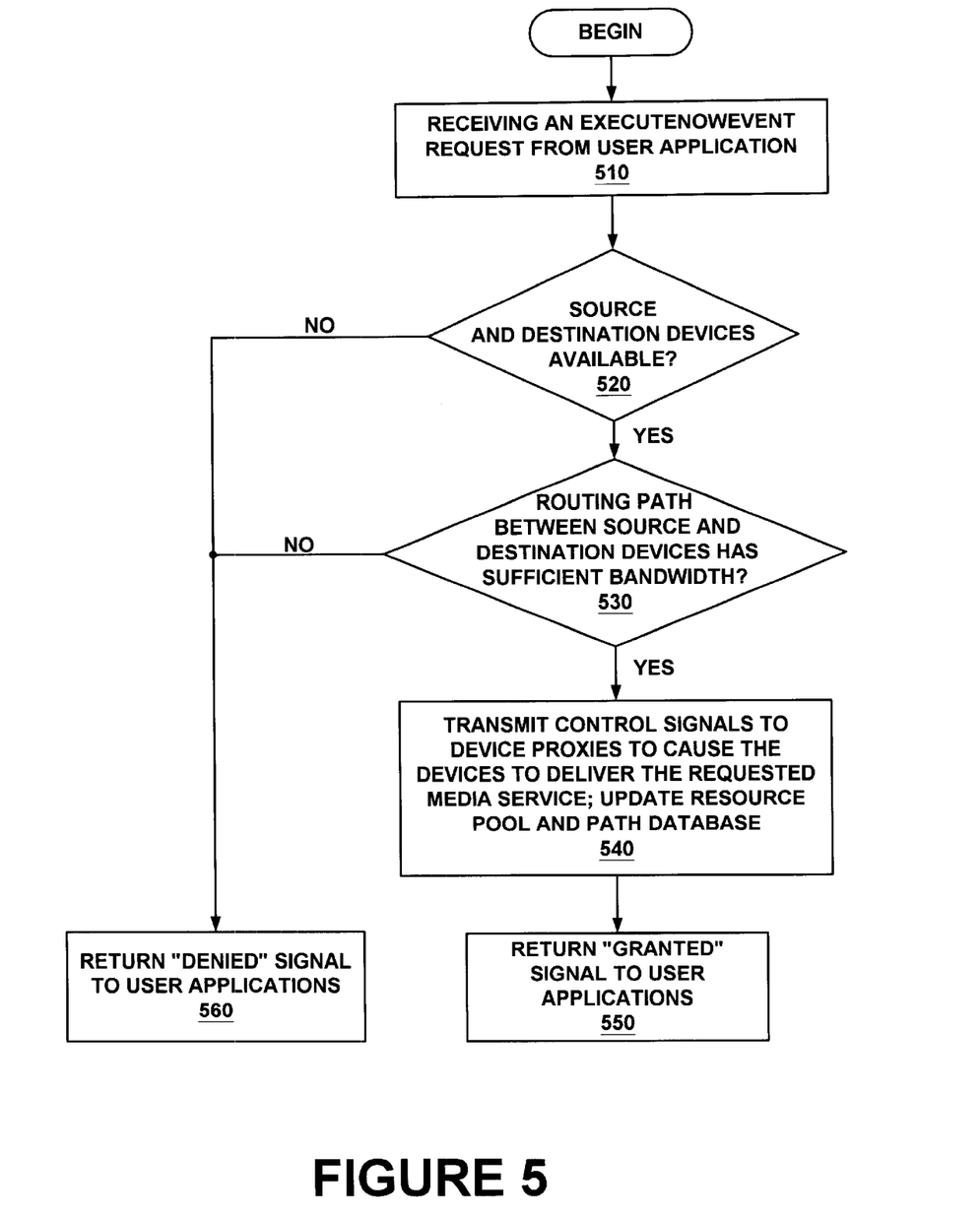
FIG. 5 is a flow diagram illustrating steps of the process of managing network resources according to an embodiment of the present invention.

FIG. 5 is a flow diagram illustrating the steps of a process 500 for managing network resources according an embodiment of the present invention. The process 500 is described in conjunction with FIG. 4. As illustrated, at step 510, resource manager 320 receives an ExecuteNowEvent request from the user application 310. According to the present invention, the ExecuteNowEvent request consists of information regarding the source device (SourceID), the destination device (DestID) and the routing path between the source device and the destination device (PathID). The ExecuteNowEvent request may further include information such as the identification of the user making the media service request.

At step 520 of FIG. 5, the resource manager 320, upon receiving the ExecuteNowEvent request, looks up the resource pool 330 and determines if the requested source and destination devices are available. According to the present invention, the resource pool 330 is a list of all devices connected to the network and is constructed upon initialization of the home server 210. The resource pool 330 is also continuously updated to keep track of devices that are added to and removed from the home entertainment network 200. If the source and destination devices are already in-use by other users or user applications, a "Denied" signal is returned to the user application 310 at step 560.

At step 530, the resource manager 320 looks up the path database 340 to determine if there is sufficient bandwidth between the source device and the destination device. In the present embodiment, the path database 340 is a table for identifying the bandwidth requirements for all possible routing paths between the devices. Methods of calculating and determining the bandwidth requirements for all possible routing paths between the devices are well known in the art, and are therefore, not described herein to avoid obscuring aspects of the present invention. If the resource manager 320 determines that insufficient bandwidth is available, the resource manager 320 returns a "Denied" signal to the user application 310 at step 560. If the requested resources are available, sends control signals to the device proxies 370 and causes the devices to carry out the media service request immediately at step 540, and returns a "Granted" signal to the user application 310 at step 550. In addition, the source devices and destination devices are removed from the resource pool 330, and the path database is updated to reflect the bandwidth usage at step 540.

Figure 6:
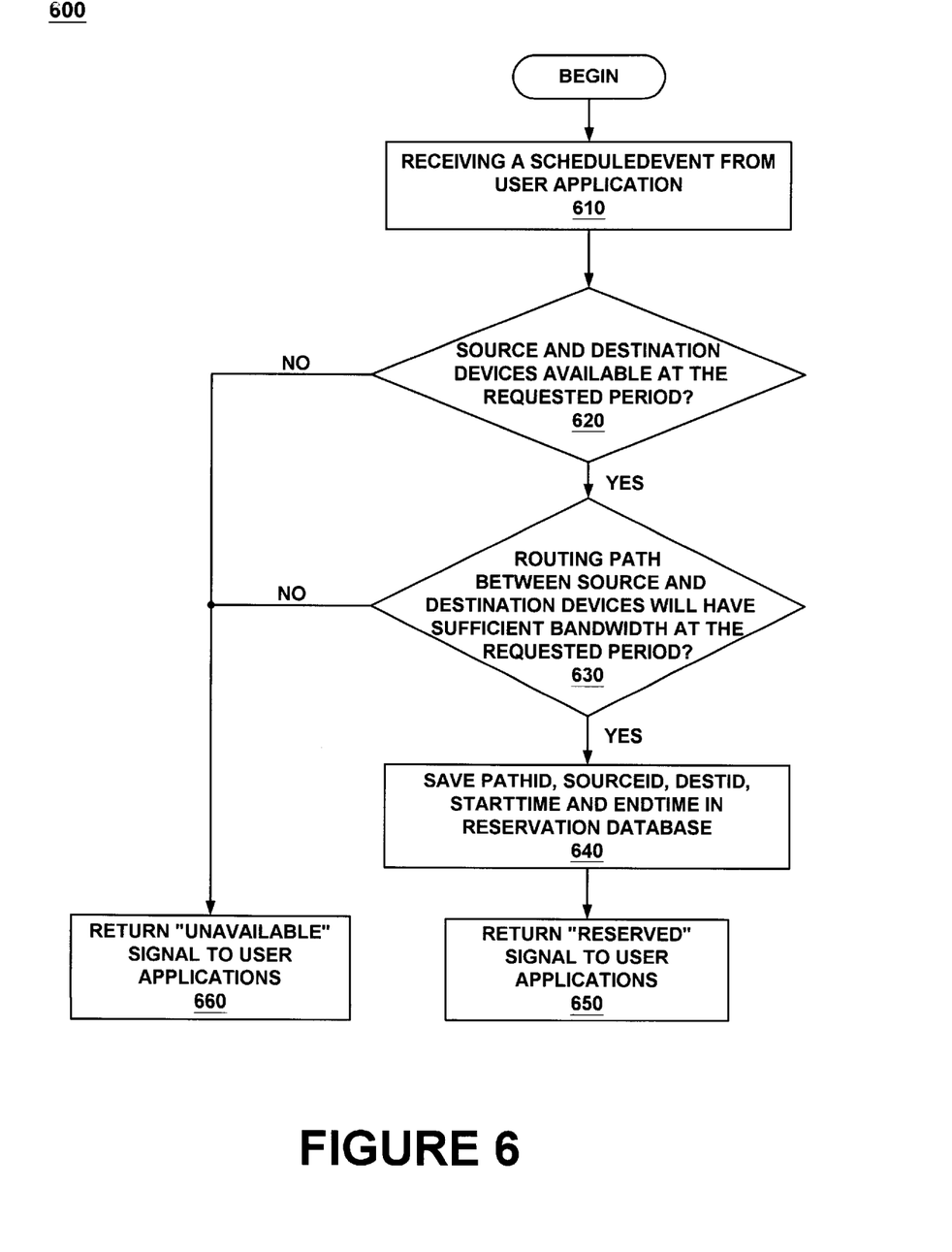
FIG. 6 is a flow diagram illustrating steps of the process of reserving network resources according to an embodiment of the present invention.

FIG. 6 is a flow diagram illustrating the steps of a process 600 for reserving network resources according to an embodiment of the present invention. The process 600 is described also in conjunction with FIG. 4. As illustrated, at step 610, resource manager 320 receives an ScheduledEvent request from the user application 310. According to the present invention, the ScheduledEvent request consists of information regarding the source device (SourceID), the destination device (DestID), the routing path between the source device and the destination device (PathID) and the start time (StartTime) and end time (EndTime) of the scheduled event. The ScheduledEvent request may further include information such as the identification of the user making the media service request.

In another embodiment of the present invention, ScheduledEvent request may include two types of requests: ExecuteWaliClockEvent and ExecuteCalendarEvent. The ExecuteWallClockEvent request is for scheduling future execution of requests based on a 24-hr clock. The ExecuteCalendarEvent is for scheduling future execution of requests based on the calendar. For example, the ExecuteWallClockEvent request is used for scheduling the recording of the "Evening News" at 6:00 pm in the evening everyday. As another example, the ExecuteCalendarEvent request is used for scheduling the backing-up of the home computer system every Sunday.

At step 620 of FIG. 6, the resource manager 320, upon receiving the ScheduledEvent request, looks up the reservation database 350 and determines if the requested source and destination devices are available. If the source and destination devices are already reserved by other users or other user applications, an "Unavailable" signal is returned to the user application 310 at step 660.

At step 630, the resource manager 320 looks up the path database 340 to determine if other reservations would affect the bandwidth of the routing path between the source device and the destination device at the request period. If the resource manager 320 determines that the routing path will be affected, the resource manager 320 returns a Failure signal to the user application 310 at step 660. If it is determined that the routing path will not be affected, the resource manager 320 then stores the SourceID, DestID, PathID, StartTime and EndTime within the reservation database 350 at step 640, and returns a "Reserved" signal to the user application 310 at step 650.

IV. ADDITIONAL FEATURES OF THE RESOURCE MANAGER OF THE PRESENT INVENTION

A. Enforcing Access Restrictions

The resource manager 320 of the present invention, when used in conjunction with other software processes of the home server 214 (e.g., Access Control Manager (ACM) and Media Binding Agent (MBA)), can be used for enforcing access restrictions. For instance, the ACM may provide user information (e.g., age of users) to the resource manager 320 and the MBA may provide meta-information (e.g., rating information) of the content of the requested media service to the resource manager 320. Access policies may be implemented within the user application 310 or the resource manager 320 to restrict access to the media contained within the devices even though the resources are available. For example, if an access policy may be implemented within resource manager 320 to prohibit users under age 13 from watching watch "R" rated movies. It is the responsibility of the resource manager 320 to enforce these access policies.

B. Conflict Resolutions

Another responsibility of the resource manager 320 is to perform conflict resolutions. If a user with a higher privilege wants to access a service originating from a single threaded device that is in use by another user with a lower privilege, the resource manager 320 attempts to resolve the conflict. It will send out a message informing the (source/destination) device is in use, and queries the more privileged user whether he/she desires to override the on-going service. A message notifying the user with the lower privilege may be sent indicating that their service is being terminated. When resources become available, the user with the lower privilege is free to re-reschedule the service. As long as there are limited resources and multiple service requests, only the service request with a higher priority will be serviced. In cases where multiple services with identical priorities request the same single threaded resources, a first come first serve policy will be observed.

C. Resource Locking

Another feature of the resource manager 320 is locking resources whereby users with lower privileges cannot access services and resources. For instance, a parent may prevent a specific category of music from playing in the home or may disallow TV viewing between the hours of 7:00 AM to 5:00 PM. With this feature, the parent can allocate services to children based on time slots. For example, a child be allowed to watch TV for 10 hours a week. The child is free to spend the 10 hours anyway, he/she feels fit. Once the 10 hours are consumed, no more TV time is permitted. The parent may put restrictions on the 10 hours of viewing time by preventing certain channels from being viewed and disallowing certain viewing hours.

D. Attribute Control

Another feature of the resource manager 320 is to control specific attributes of a resource device once a service has started. An example of this feature is regulating volume controls for a music category (e.g., rap, rock, etc.). This can be done for specific locations in a home or for all locations. If a child's room is the designation location for "rap" music and the resource manager 320 has previously configured the child's room for volume control, when the rap music plays in that room the volume controls will be regulated. A parent may want such volume control to prevent base waves from reverberating throughout the house. The resource manager 320 accomplishes this task by detecting the service category for the child's room and regulating volume control on the designation device.

The attribute control functionality of the resource manager 320 may also be used to augment a service. For example, if a user is watching a horror movie in the family room, the resource manager 320 can draw the drapes and dim the lights (provided that the drape controls and the light controls are connected to the home network 200) while the movie is playing. As another example, if a telephone call is detected in the room where the movie is being viewed, the resource manager 320 can pause the movie and turn the lights on.

The present invention, a computer implemented process for managing resources within a home entertainment network, has thus been described. By providing a centralized resource allocation and access control system, security of the home entertainment network can be achieved. While the present invention has been described in particular embodiments, it should also be appreciated that the present invention should not be construed as limited by such embodiments, but should be construed according to the below claims.

What is claimed is:

1. A method of managing resources within a network including a plurality of consumer electronic media devices, said method comprising the steps of:
   a) providing a resource manager for manging resources within said network;
   b) receiving a request for a media service, said request identifying a source consumer electronic media device and a destination consumer electronic media device that are necessary for performing said media service;
   c) based on said request, said resource manager determining whether said source consumer electronic media device and said destination consumer electronic device are available for performing said media service;
   d) said resource manager determining whether a routing path between said source and said destination consumer electronic media devices has sufficient bandwidth for performing said media service; and
   e) provided said source electronic media device and said destination electronic media device are available and provided said routing path has sufficient bandwidth, said resource manager transmitting control signals to cause said plurality of consumer electronic media devices to provide said media service.

2. The method as recited in claim 1 further comprising the step of returning a failure message provided said routing path does not have sufficient bandwidth for performing said media service.

3. The method as recited in claim 1 further comprising the steps of:
   constructing a list having a plurality of entries each corresponding to a respective one of said plurality of consumer electronic media devices;
   removing one of said entries from said list when a corresponding one of said plurality of consumer electronic media devices becomes unavailable; and
   adding a new entry to said list when one of said plurality of consumer electronic media devices becomes available.

4. The method as recited in claim 1 further comprising the steps of:
   constructing a list having a plurality of entries each corresponding to a respective one of a plurality of routing paths connecting consumer electronic media devices of said network;
   determining bandwidth requirements for said routing paths of said network and generating data representative thereof; and
   storing said data into a path database.

5. The method as recited in claim 4 further comprising the steps of:
   removing one of said entries from said list when a corresponding one of said plurality of routing paths becomes unavailable; and
   adding a new entry to said list when said corresponding routing path becomes available.

6. The method as recited in claim 1 further comprising the step of storing configuration information in a configuration database for each consumer electronic media device coupled to said network.

7. The method as recited in claim 1 further comprising the steps of:
   storing resource reservation information into a reservation database;
   provided said media service is to be delivered in a later time, reserving said source consumer electronic media device, said destination consumer electronic media device and said routing path by adding an entry to said reservation database; and
   informing said network that said media service is unavailable at said later time.

8. A computer-usable medium having computer-readable program code embodied therein for causing a computer system to perform a method of managing resources within a network including a plurality of consumer electronic media devices, said method comprising the steps of:
   a) providing a resource manager for managing resources within said method;
   b) receiving a request for a media service, said request identifying a source consumer electronic media device and a destination consumer electronic media device that are necessary for performing said media service;
   c) based on said request, said resource manager determining whether said source consumer electronic media device and said destination consumer electronic device are available for performing said media service;
   d) said resource manager determining whether a routing path between said source and said destination consumer electronic media devices has sufficient bandwidth for performing said media service; and
   e) provided said plurality of electronic media devices are available and provided said routing path has sufficient bandwidth, said resource manager transmitting control signals to cause said plurality of consumer electronic media devices to provide said media service.

9. The computer-usable medium as recited in claim 8 wherein said method further comprises the step of returning a failure message provided said routing path does not have sufficient bandwidth for performing said media service.

10. The computer-usable medium as recited in claim 8 wherein said method further comprises the steps of:
    constructing a list having a plurality of entries each corresponding to a respective one of said consumer electronic media devices coupled to said network;
    removing one of said entries from said list when a corresponding one of said plurality of consumer electronic media devices becomes unavailable; and
    adding a new entry to said list when one of said plurality of consumer electronic media devices becomes available.

11. The computer-usable medium as recited in claim 8 wherein said method further comprises the steps of:
    constructing a list having a plurality of entries each corresponding to a respective one of a plurality of routing paths connecting consumer electronic media devices of said network;
    determining bandwidth requirements for said routing paths of said network and generating data representative thereof; and
    storing said data into a path database.

12. The computer-usable medium as recited in claim 11 wherein said method further comprises the steps of:
    removing one of said entries from said list when a corresponding one of said plurality of routing paths becomes unavailable; and
    adding a new entry to said list when said corresponding routing path becomes available.

13. The computer-usable medium as recited in claim 8 wherein said method further comprises the step storing configuration information into a configuration database for each consumer electronic media device coupled to said network.

14. The computer-usable medium as recited in claim 8 wherein said method further comprises the steps of:
    storing resource reservation information into a reservation database;
    provided said media service is to be delivered in a later time, reserving said source consumer electronic media device, said destination consumer electronic media device and said routing path by adding an entry to said reservation database; and
    informing said network that said media service is unavailable at said later time.

15. A home server comprising:
    a processor;
    a bus coupled to said processor; and
    a computer readable memory coupled to said bus and having stored therein computer readable program code for causing said home server to perform a method of managing resources within a network including a plurality of consumer electronic media devices, said home server, said method comprising the steps of:
    a) providing a resource manager for managing resources of said network;
    b) receiving a request for a media service, said request identifying a source consumer electronic media device and a destination consumer electronic media device coupled to said network that are necessary for performing said media service;

c) based on said request, said resource manager determining whether said source consumer electronic media device and said destination consumer electronic device are available for performing said media service;

d) said resource manager determining whether a routing path between said source and said destination consumer electronic media devices has sufficient bandwidth for performing said media service; and e) provided said plurality of electronic media devices are available and provided said routing path has sufficient bandwidth, said resource manager transmitting control signals to cause said plurality of consumer electronic media devices to provide said media service.

16. The home server as recited in claim 15 wherein said method further comprises the step of returning a failure message provided said routing path does not have sufficient bandwidth for performing said media service.

17. The home server as recited in claim 15 wherein said method further comprises the steps of:

constructing a list having a plurality of entries each corresponding to a respective one of consumer electronic media devices coupled to said network;

removing one of said entries from said list when a corresponding one of said plurality of consumer electronic media devices becomes unavailable; and adding a new entry to said list when one of said plurality of consumer electronic media devices becomes available.

18. The home server as recited in claim 15 wherein said method further comprises the steps of:

constructing a list having a plurality of entries each corresponding to a respective one of a plurality of routing paths connecting consumer electronic media devices of said network;

determining bandwidth requirements for said routing paths of said network and generating data representative thereof; and storing said data in a path database.

19. The home server as recited in claim 18 wherein said method further comprises the steps of:

removing one of said entries from said list when a corresponding one of said plurality of routing paths becomes unavailable; and adding a new entry to said list when said corresponding routing path is becomes available.

20. The home server as recited in claim 15 wherein said method further comprises the step of storing configuration information into a configuration database for each consumer electronic media device coupled to said network.

21. The home server as recited in claim 15 wherein said method further comprises the steps of:

storing resource reservation information into a reservation database;

provided said media service is to be delivered in a later time, reserving said source consumer electronic media device, said destination consumer electronic media device and said routing path by adding an entry to said reservation database; and informing said network that said media service is unavailable at said later time.

* * * * *